(12) United States Patent
Zhang et al.

(10) Patent No.: US 10,943,704 B2
(45) Date of Patent: Mar. 9, 2021

(54) BAFFLE STRUCTURE FOR CHANNEL (71) Applicant: Tsinghua University, Beijing (CN)

(72) Inventors: Zuoyi Zhang, Beijing (CN); Hong Wang, Beijing (CN); Jie Wang, Beijing (CN); Qinzhao Zhang, Beijing (CN); Wei Peng, Beijing (CN)

(73) Assignee: Tsinghua University, Beijing (CN)

( * ) Notice: Subject to any disclaimer, the term of this patent is extended or adjusted under 35 U.S.C. 154(b) by 517 days.

(21) Appl. No.: 15/744,674

(22) PCT Filed: Jul. 13, 2016

(86) PCT No.: PCT/CN2016/089936
§ 371 (c)(1),
(2) Date: Jan. 12, 2018

(87) PCT Pub. No.: WO2017/008746
PCT Pub. Date: Jan. 19, 2017

(65) Prior Publication Data
US 2018/0197642 A1 Jul. 12, 2018

(30) Foreign Application Priority Data

Jul. 13, 2015 (CN) .......................... 201510409138.1
Jul. 13, 2015 (CN) .......................... 201520504843.5

(51) Int. Cl.
*G21C 15/18* (2006.01)
*G21C 9/00* (2006.01)
(Continued)

(52) U.S. Cl.
CPC ............ *G21C 15/18* (2013.01); *F16K 1/2007* (2013.01); *F16K 15/181* (2013.01); *G21C 9/00* (2013.01);
(Continued)

(58) Field of Classification Search
CPC .......... G21C 9/00; G21C 9/02; G21C 13/067; G21C 13/0735; G21C 15/00; G21C 15/18
See application file for complete search history.

(56) References Cited

U.S. PATENT DOCUMENTS 4,732,729 A    3/1988  Amano et al.
5,941,278 A    8/1999  Upton et al.

FOREIGN PATENT DOCUMENTS

CN    2104361 U    5/1992
CN    2523953 Y    12/2002
(Continued)

OTHER PUBLICATIONS

International Search Report for International Application No. PCT/CN2016/089936 dated Oct. 19, 2016, 2 pages.
(Continued)

*Primary Examiner* — Marshall P O'Connor
(74) *Attorney, Agent, or Firm* — TraskBritt (57) ABSTRACT

A channel baffle structure comprises a pipe, a swing check plate and a driving apparatus, wherein the main part of the swing check plate is located inside the pipe, and the driving apparatus is disposed outside the pipe. A connection structure is used for connecting the driving apparatus and the swing check plate. The check plate can be opened and closed passively by gravity and fluid pressure, but can also be actively opened and closed by the driving apparatus, such that requirements for multiple operating conditions of the channel can be satisfied.

10 Claims, 6 Drawing Sheets

(51) Int. Cl.
    *F16K 15/18*     (2006.01)
    *F16K 1/20*     (2006.01)
    *G21C 15/00*     (2006.01)
    *G21C 9/02*     (2006.01)
    *G21C 13/067*     (2006.01)
    *G21C 13/073*     (2006.01)

(52) U.S. Cl.
    CPC ............. *G21C 9/02* (2013.01); *G21C 13/067* (2013.01); *G21C 13/0735* (2013.01); *G21C 15/00* (2013.01); *Y02E 30/30* (2013.01)

(56) References Cited

FOREIGN PATENT DOCUMENTS

| | | | |
|---|---|---|---|
| CN | 101566237 | A | 10/2009 |
| CN | 102221107 | A | 10/2011 |
| CN | 102661407 | A | 9/2012 |
| CN | 203146966 | U | 8/2013 |
| CN | 103307320 | A | 9/2013 |
| CN | 103486084 | A | 1/2014 |
| CN | 103500590 | A | 1/2014 |
| CN | 104992731 | A | 10/2015 |
| CN | 204791997 | U | 11/2015 |
| WO | 2014193992 | A1 | 12/2014 |

OTHER PUBLICATIONS

International Written Opinion for International Application No. PCT/CN2016/089936 dated Oct. 19, 2016, 4 pages.
European Extended Search Report and Opinion for European Application No. 16823893, dated Feb. 12, 2019, 6 pages.

BAFFLE STRUCTURE FOR CHANNEL

CROSS-REFERENCE TO RELATED APPLICATIONS

This application is a national phase entry under 35 U.S.C. § 371 of International Patent Application PCT/CN2016/089936, filed Jul. 13, 2016, designating the United States of America and published as International Patent Publication WO 2017/008746 on Jan. 19, 2017, which claims the benefit under Article 8 of the Patent Cooperation Treaty to Chinese Patent Application Serial No. 201510409138.1 and to Chinese Patent Application Serial No. 201520504843.5 filed Jul. 13, 2015.

TECHNICAL FIELD

The present disclosure relates to the technical field of fluids machinery, and particularly, to a channel baffle structure.

BACKGROUND

Figure 1:
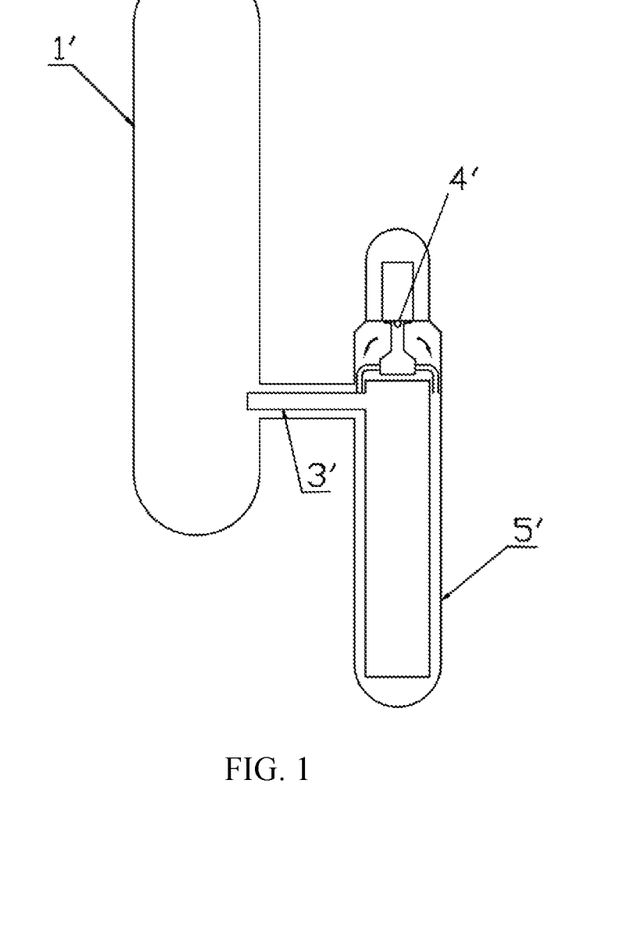
FIG. 1 is a schematic diagram of an overall structure of a primary circuit of an HTR nuclear power plant.

A High Temperature Gas-Cooled Reactor (HTR) applies graphite as a moderator and helium as a coolant, and it is an advanced nuclear reactor with good inherent safety, high-power generation efficiency and widespread usages. An overall structure of the primary circuit of an HTR nuclear power plant is illustrated in FIG. 1, which comprises a reactor pressure vessel 1' and a steam generator pressure vessel 5', wherein a hot gas duct 3' is connected therebetween. The reactor core is cooled by helium. The HTR applies a helium circulator to drive the helium coolant circulating inside the primary circuit of the reactor. The helium circulator 4' is arranged vertically and installed directly above the steam generator pressure vessel 5'.

It can be seen from FIG. 1 that the entire helium circulator 4' is located inside the primary circuit and connected with the reactor core. In order to prevent reverse natural flow with a high temperature up to 750° C. in the reactor core in an accident of reactor shutdown, a baffle should be installed at the inlet or outlet of the helium circulator 4', which plays a role of blocking and isolating. Otherwise, the high temperature heat flow with a temperature up to 750° C. will flow through the outer wall of the hot gas duct 3' and other boundaries of the primary circuit, whose design temperature is lower than 750° C. This causes pressure boundaries of the primary circuit to be damaged and the safety of the reactor to be seriously impacted. In addition, there is an operating condition of small flow for the HTR, which requires a small flow of helium to flow reversely (in an opposite direction of the helium flow of the helium circulator in normal operating conditions) through the helium circulator. At this time, the baffle of the helium circulator should be in a small opening state so as to guarantee a certain gas-flow speed.

In order to be consistent with passive safety characteristics possessed by an HTR nuclear power plant, choosing a tongue plate structure similar to a check valve for the baffle structure is desirable. Generally, the tongue plate is to be opened and closed by the helium pressure and tongue plate gravity, which realizes a unidirectional flow of the helium. In addition, gas intake and gas exhaust directions of the helium circulator in the HTR are along an axial direction, and thus a swing check plate with the simplest structure must be chosen. Further, in order to satisfy the "diversity" requirements of design for nuclear power plants, a driving apparatus to drive the tongue plate of the swing check plate must be chosen. When passive characteristics of the swing check plate fail, active opening and closing of the tongue plate is realized, such that the baffle of the helium circulator have the active and passive characteristics at the same time. In addition, in the operating condition of small flow, it is difficult to control the opening and closing of the tongue plate only by the helium pressure and tongue plate gravity, and thus there is a need for a driving apparatus to complete the control. However, there is hardly any introduction about the specific connection structure between the driving apparatus and the swing check plate in the prior art. Therefore, it is a problem that a person skilled in the art needs to overcome to connect a driving apparatus and a swing check plate to realize the opening and closing as well as adjusting of the baffle of helium circulator of the HTR.

BRIEF SUMMARY

1. Technical Problem to be Solved

The purpose of the present disclosure is to provide a channel baffle structure so as to realize that the channel is able to be opened and closed in both active and passive functions and to be able to adapt to work requirements of multiple operating conditions.

2. Technical Solution

In order to solve the above-mentioned technical problem, the present disclosure provides a channel baffle structure, which comprises a pipe, a swing check plate and a driving apparatus. The swing check plate comprises a tongue plate, a crank connecting rod and a rotating shaft. One end of the crank connecting rod is connected with the tongue plate through a nut, and the other end is welded on a shaft sleeve of the rotating shaft. The pipe wall of the pipe is provided with a circular opening for placing the tongue plate in a fully open state. The crank connecting rod and a circular branch pipe are welded at the circular opening. The axis of the circular branch pipe is perpendicular to the axis of the pipe, an end of the circular branch pipe is in a form of flange structure and connected with a pipe side cover plate by bolts. The tongue plate, the crank connecting rod and a part of the rotating shaft of the swing check plate are arranged within the pipe. The driving apparatus is arranged outside the pipe and the swing check plate and driving apparatus are connected through the rotating shaft, a bevel gear and a driving apparatus connecting shaft. One end of the rotating shaft is connected with the swing check plate, and the other end is connected with the bevel gear. One end of the driving apparatus connecting shaft is connected with the bevel gear, and the other end of the driving apparatus connecting shaft is connected with the driving apparatus. The channel baffle structure also comprises a special structure used for connecting the driving apparatus and the swing check plate, specifically, a key is installed on the rotating shaft connected with the crank connecting rod, an annular keyway is correspondingly set within the shaft sleeve of the rotating shaft, such that the shaft sleeve has an idle travel of 90-degree free rotation around the rotating shaft and the key is positioned within the annular keyway.

Wherein, the rotating shaft is arranged at an inlet end of the pipe.

Wherein, a supporting frame is welded at the outer wall surface of the pipe and the lower part of the rotating shaft so as to support the rotating shaft.

Wherein, taking the axis of the rotating shaft as a reference direction, the radial height of the annular keyway is 0.1-0.3 mm higher than the radial height of the key, the circumferential angle α of the annular keyway is between 90° and 100°, and the axial length of the annular keyway is 0.1-0.3 mm longer than the axial length of the key.

Wherein, the annular keyway is in clearance fit with the key.

Wherein, a fully open position annular sealing surface adjacent to the pipe wall of the pipe is welded at an inner wall surface of the circular branch pipe of the pipe, and when the pipe is in the fully open state, the tongue plate is in contact with the fully open position annular sealing surface.

Wherein, a fully closed position annular sealing surface is arranged at the inlet end of the pipe adjacent to the pipe wall, and when the pipe is in the fully closed state, the tongue plate is in contact with the fully closed position annular sealing surface.

Wherein, when the driving apparatus controls the pipe to be opened or closed, the key is always directly above the rotating shaft in view from the direction parallel to the axis of the rotating shaft.

Wherein, in the operating condition of small flow, after the pipe is opened or closed by taking the active characteristics of the driving apparatus to drive the tongue plate to move, it is required to rotate the rotating shaft reversely by the driving apparatus, such that the key rotates in the annular keyway reversely, until it is located directly above the rotating shaft, so as to prepare to open or close the pipe the next time.

Wherein, in order to achieve a small opening state of the pipe when the fluid flows reversely, in view from the direction perpendicular to the page, the key has to be turned clockwise to a desired angle by the driving apparatus, such that the clockwise side of the key is adjacent to the clockwise side of the annular keyway.

3. Advantageous Effects

The channel baffle structure provided by the present disclosure comprises a pipe, a swing check plate and a driving apparatus, wherein a tongue plate of the swing check plate can be rotated under an external force so as to open or close the pipe. When the flow of fluid required to pass through the pipe is large, rotating of the tongue plate can be automatically realized by fluid pressure and tongue plate gravity, thereby realizing the opening and closing of the pipe; when the flow of fluid required to pass through the pipe is small or flows reversely, the rotating of the tongue plate can be controlled by the driving apparatus, thereby realizing the opening, closing and partial opening of the pipe. The control of opening and closing of the channel connected with the pipe can be realized by the tongue plate under both active and passive functions, and the baffle structure is simple in structure and can adapt to the requirements of multiple operating conditions of the channel.

DETAILED DESCRIPTION

Detailed description of the present disclosure is further described in detail below in combination with the accompanying drawings and embodiments. The following embodiments are used to explain the present disclosure, but are not used to limit the scope of the present disclosure.

Figure 2:
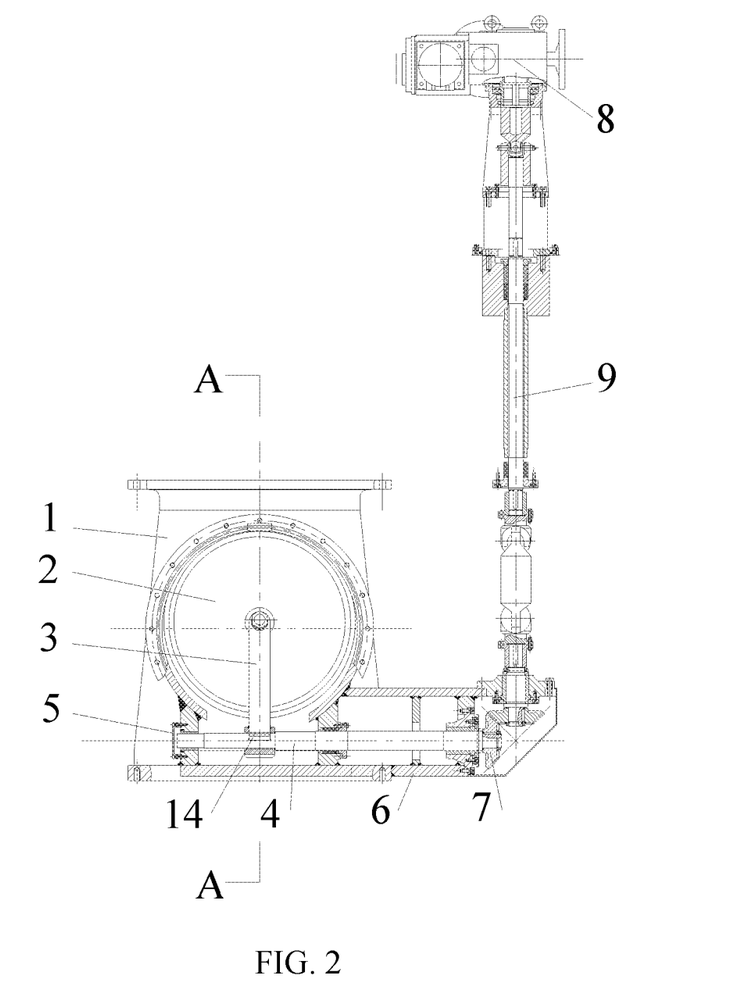
FIG. 2 is a structural schematic diagram of a channel baffle structure provided by an embodiment of the present disclosure.
Figure 4:
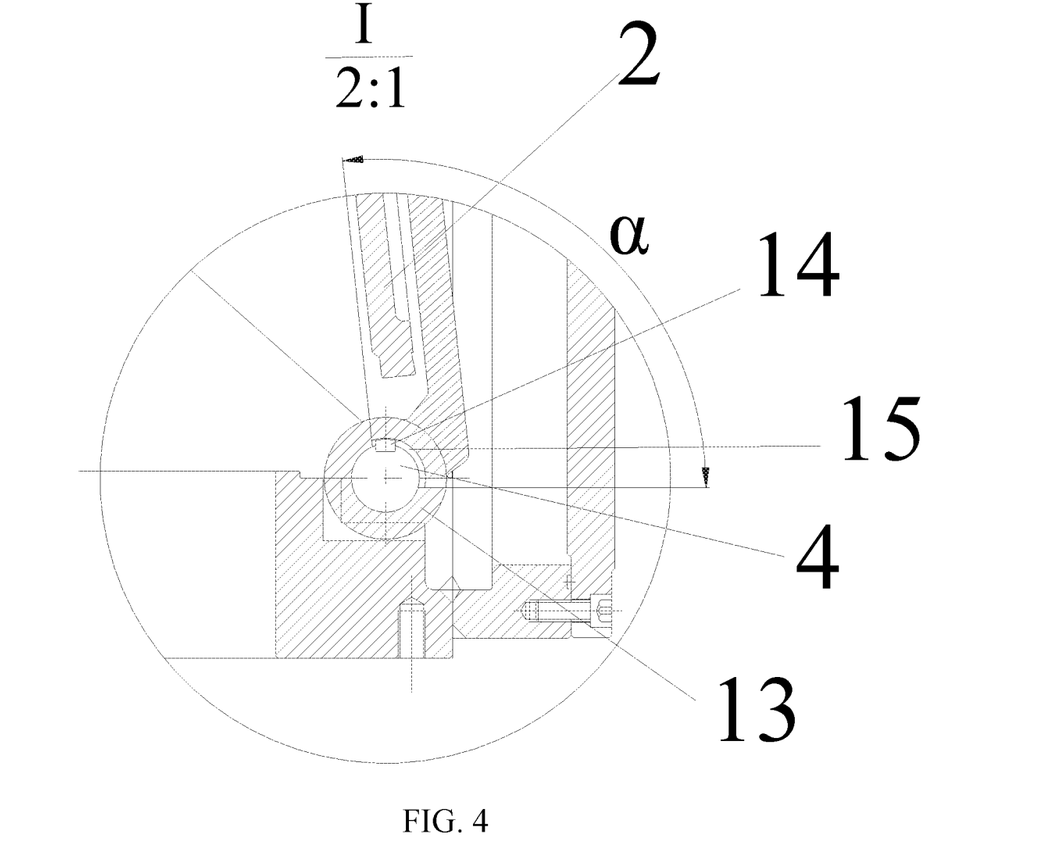
FIG. 4 is an enlarged view of a specific connection structure at a rotating shaft of the baffle structure provided by an embodiment of the present disclosure when controlling a conical pipe to be fully opened.

As illustrated in FIG. 2, a channel baffle structure provided by an embodiment of the present disclosure comprises three parts of a pipe 1, a swing check plate and a driving apparatus 8, wherein the swing check plate comprises a tongue plate 2, a crank connecting rod 3 and a rotating shaft 4. One end of the crank connecting rod 3 is connected with the tongue plate 2 through a nut, and the other end is welded on a shaft sleeve 13 (FIG. 4). The rotating shaft 4 is arranged adjacent to an inlet of the pipe 1. The tongue plate 2, the crank connecting rod 3 and a part of the rotating shaft 4 of the swing check plate are arranged within the pipe 1. The swing check plate and the driving apparatus 8 are connected through the rotating shaft 4, a bevel gear 7 and a driving apparatus connecting shaft 9. One end of the rotating shaft 4 is connected with the swing check plate, and the other end is connected with the bevel gear 7; one end of the driving apparatus connecting shaft 9 is connected with the bevel gear 7, and the other end is connected with the driving apparatus 8. The rotating shaft 4 and the driving apparatus connecting shaft 9 play a role of connecting, and the bevel gear 7 plays a role of turning and transferring torque. The driving apparatus 8 is arranged outside the pipe 1, and the arrangement position is chosen as required. In order to support the rotating shaft 4, a supporting frame 6 is welded at the outer wall surface of the pipe 1 and the lower part of the rotating shaft 4. When the pipe 1 is installed vertically; the baffle structure can be used in the helium circulator of HTR. At this time, the pipe 1 is a conical pipe. This realizes the control of the opening and closing of the baffle of the helium circulator of HTR in the active and passive conditions. The baffle structure can also be used in non-return valves, check valves or other pipe circuits to control the opening and closing of pipes. That is, controlling the rotation of the tongue plate 2 using the pressure of the fluid that flows through the pipe 1 or the gravity of the tongue plate 2 and thus controlling the opening and closing of the pipe 1, or controlling the rotation of the tongue plate 2 by the driving apparatus 8 so as to control the opening of the pipe 1. When the pipe 1 of the baffle structure is horizontally installed, the tongue plate 2 is rotated by the driving function of the fluid pressure or the driving apparatus 8. The present embodiment is described by taking an example where the baffle structure is used in helium circulator of HTR, wherein the baffle structure is installed at the inlet of the helium circulator, and the driving apparatus 8 may be an electric driving apparatus, a pneumatic driving apparatus or an electromagnetic driving apparatus. In the present embodiment, the electric driving apparatus is chosen, and the pipe 1 is a conical pipe. Wherein, the conical pipe is an inlet pipe in front of an impeller of the helium circulator, and its small cross-section is adjacent to the impeller of the helium circulator. When the helium circulator is normally operated, gas-flow flows from the large cross-section to the small cross-section of the conical pipe, that is, the gas-flow flows into the helium circulator from bottom to top in an axial direction.

Figure 6:
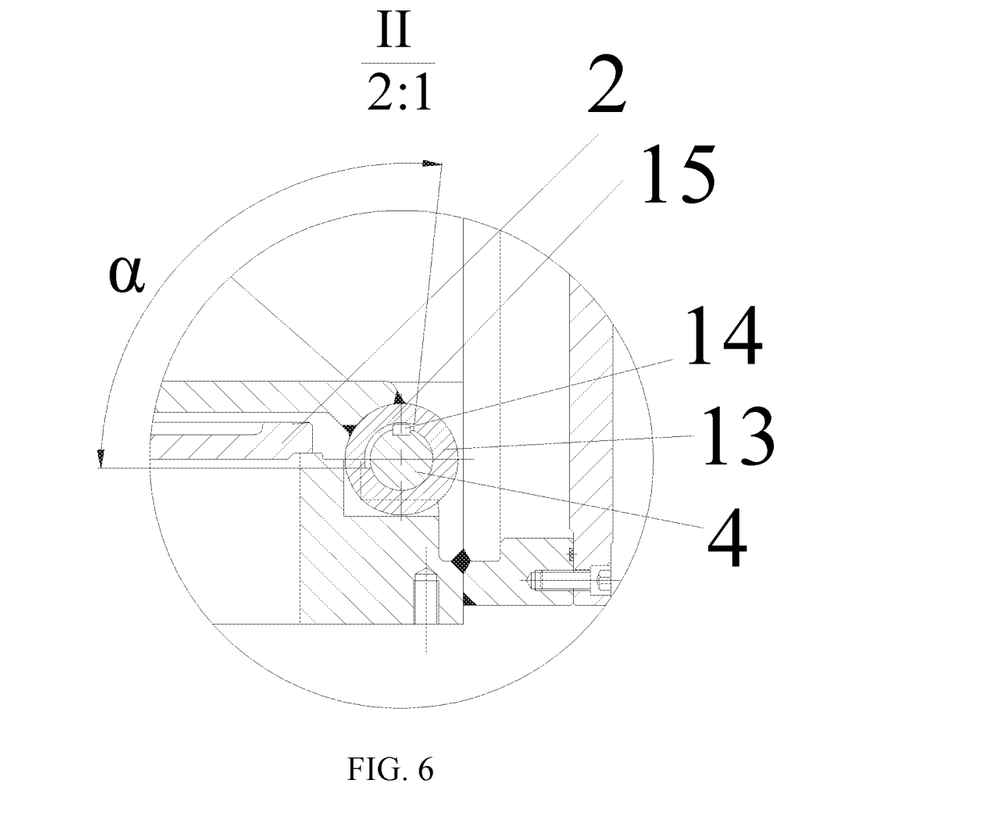
FIG. 6 is an enlarged view of a specific connection structure at a rotating shaft of the baffle structure provided by an embodiment of the present disclosure when controlling a conical pipe to be fully closed.

In order to make the baffle structure have both active and passive characteristics at the same time, a particular set of specific connection structure is specially designed: as illustrated in FIGS. 4 and 6, a key 14 is installed at the rotating shaft 4 connected with the crank connecting rod 3, an annular keyway 15 is cut out at the inner surface of the shaft sleeve 13 adjacent to the rotating shaft 4, such that the shaft sleeve 13 has an idle travel of 90-degree free rotation around the rotating shaft 4. The key 14 is positioned within the annular keyway 15, and the key 14 is in clearance fit with the annular keyway 15. Taking the axis of the rotating shaft 4 as a reference direction, the radial height of the annular keyway 15 is 0.1-0.3 mm higher than the radial height of the key 14, the circumferential angle α of the annular keyway 15 is between 90° and 100°, and the axial length of the annular keyway 15 is about 0.1-0.3 mm longer than the axial length of the key 14.

Figure 3:
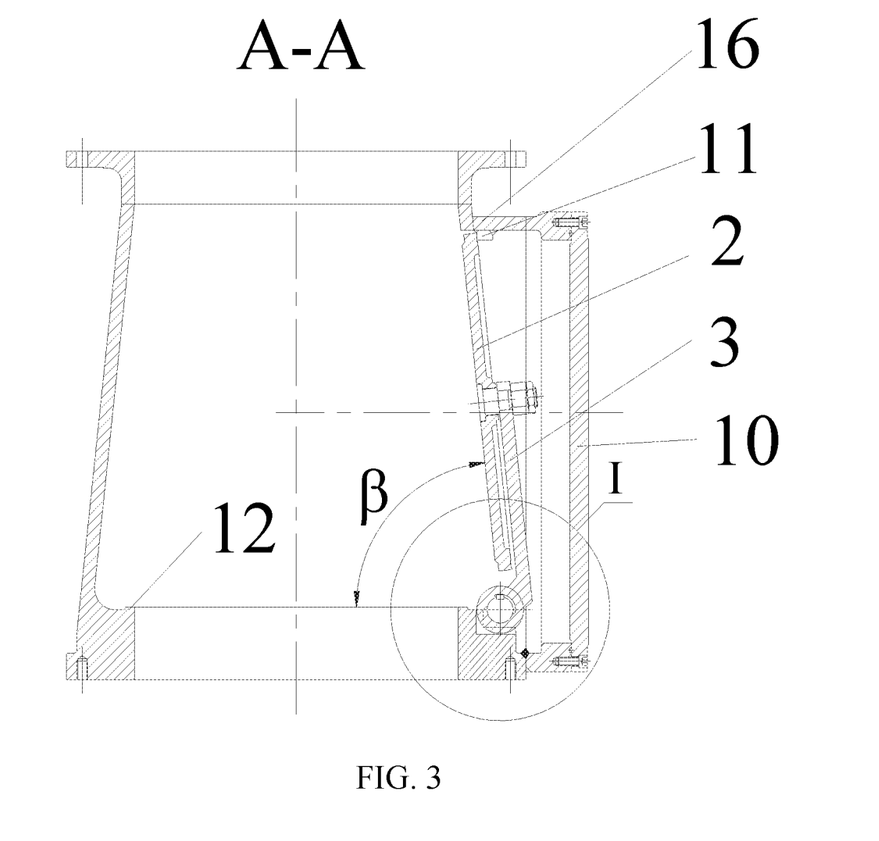
FIG. 3 is a cross-sectional view taken along the line A-A of the baffle structure provided by an embodiment of the present disclosure when controlling a conical pipe to be fully opened.

The cross-sectional view taken along the line A-A of the baffle structure of the present embodiment when controlling the conical pipe to be fully opened is illustrated in FIG. 3. As illustrated, the pipe wall of the conical pipe has a circular opening for placing the tongue plate 2 and the crank connecting rod 3 in a fully open state. A circular branch pipe 16 is welded at the opening, whose axis is perpendicular to the axis of the conical pipe 1. An end of the circular branch pipe 16 is in a form of flange structure and connected with a pipe side cover plate 10 by bolts, which plays a role of sealing and preventing dust from entering inside the helium circulator. A fully open position annular sealing surface 11 is welded at an inner wall surface of the circular branch pipe 16, which is adjacent to the pipe wall of the conical pipe. When the baffle of the helium circulator is fully opened, the tongue plate 2 and the crank connecting rod 3 are parallel to the pipe wall of the conical pipe, and the tongue plate 2 is in contact with the fully open position annular sealing surface 11.

Figure 5:
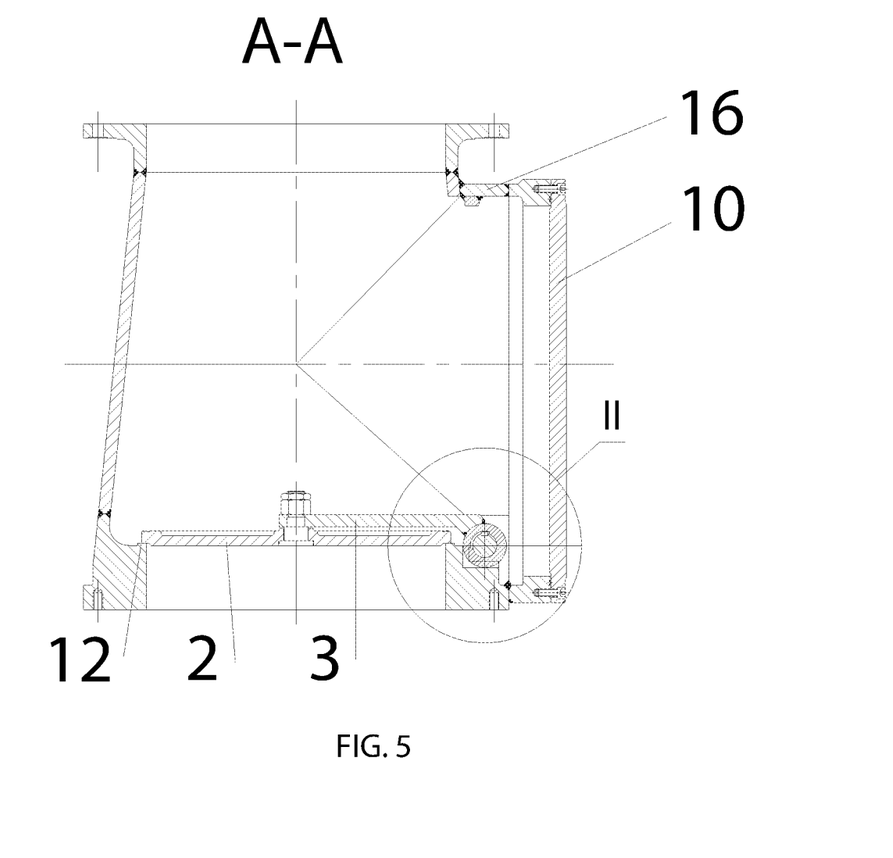
FIG. 5 is a cross-sectional view taken along the line A-A of the baffle structure provided by an embodiment of the present disclosure when controlling a conical pipe to be fully closed.

The cross-sectional view taken along the line A-A of the baffle structure of the present embodiment when controlling the conical pipe to be fully closed is illustrated in FIG. 5. As illustrated, the large cross-section of the conical pipe is an inlet of the helium circulator, and a fully closed position annular sealing surface 12 is arranged at the inlet adjacent to the pipe wall of the conical pipe. When the baffle of the helium circulator is fully closed, the tongue plate 2 and the crank connecting rod 3 are perpendicular to the axis of the conical pipe, and the tongue plate 2 is in contact with the fully closed position annular sealing surface 12, which closes the inlet of the helium circulator.

The working principle and operating sequence of the baffle structure in the embodiment are as follows:

Generally, the baffle structure relies on helium pressure and gravity of the tongue plate 2 and the crank connecting rod 3 to realize the opening and closing of the conical pipe, that is, the passive characteristics of how the baffle structure mainly functions. When helium flows reversely, that is, the helium flows in the same direction as that of gravity, or when the helium pressure is smaller than the gravity of the tongue plate 2 and the crank connecting rod 3, the tongue plate 2 rotates counterclockwise around the rotating shaft 4 under the action of gravity (referring to the direction perpendicular to the page, the same below), until in contact with the fully closed position annular sealing surface 12, which closes the inlet of the conical pipe and, in turn, closes the baffle of the helium circulator. When helium flows normally, that is, the helium flows in the opposite direction as that of gravity, or when the helium pressure is larger than the gravity of the tongue plate 2 and the crank connecting rod 3, the tongue plate 2 rotates clockwise around the rotating shaft 4 under the action of pressure, until in contact with the fully open position annular sealing surface 11 and parallel to the pipe wall of the conical pipe, such that the inlet of the conical pipe is not blocked and the baffle of the helium circulator is opened.

When the baffle of the helium circulator is opened and closed by passive characteristics, since the rotating shaft 4 and the annular keyway 15 are clearance fit, when the tongue plate 2 rotates, the rotating shaft 4 and the key 14 do not move but only rotate with the shaft sleeve 13. In this process, the key 14 is always located directly above the rotating shaft 4. When the inlet of the conical pipe is in a closed state, the clockwise side of the key 14 is adjacent to the clockwise side of the annular keyway 15; when the helium circulator is in an open state, the counterclockwise side of the key 14 is adjacent to the counterclockwise side of the annular keyway 15.

When the passive characteristics fail, the active characteristics of the baffle structure have to function, which rely on the driving apparatus 8 to drive the tongue plate 2 to move so as to realize the opening and closing of the baffle of the helium circulator. In order to close the baffle of the helium circulator, the driving apparatus 8 drives the rotating shaft 4 to rotate counterclockwise. Since the counterclockwise side of the key 14 is adjacent to the counterclockwise side of the annular keyway 15, the key 14 drives the shaft sleeve 13 to rotate counterclockwise, thereby driving the tongue plate 2 to rotate counterclockwise, until the tongue plate 2 is in contact with the fully closed position annular sealing surface 12. Likewise, in order to open the baffle of the helium circulator, the driving apparatus 8 drives the rotating shaft 4 to rotate clockwise. The key 14 drives the shaft sleeve 13 to rotate clockwise, thereby driving the tongue plate 2 to rotate clockwise, until the tongue plate 2 is in contact with the fully open position annular sealing surface 11, so as to open the baffle of the helium circulator.

After the baffle of the helium circulator is closed, the rotating shaft 4 is rotated clockwise by the driving apparatus 8, such that the key 14 rotates clockwise within the annular keyway 15, and the shaft sleeve 13 of the rotating shaft 4 does not move, until the key 14 is reset to be directly above the rotating shaft 4, and the clockwise side of the key 14 is adjacent to the clockwise side of the annular keyway 15, so as to prepare to open the baffle of the helium circulator next time.

After the baffle of the helium circulator is opened, the rotating shaft 4 is rotated counterclockwise by the driving apparatus 8, such that the key 14 rotates counterclockwise within the annular keyway 15, and the shaft sleeve 13 does not move, until the key 14 returns back to the position directly above the rotating shaft 4, the counterclockwise side of the key 14 is adjacent to the counterclockwise side of the annular keyway 15, so as to prepare to close the baffle of the helium circulator next time.

In summary, after the baffle of the helium circulator is closed or opened by active characteristics, the key 14 is reset by being rotated in the opposite direction of the movement of the tongue plate 2 by the driving apparatus 8, so as to prepare to open or close the baffle of the helium circulator next time.

In the operating condition of small opening and the helium flows reversely, the helium pressure is consistent with the gravity direction of the tongue plate 2 and the crank connecting rod 3. At this time, the baffle structure cannot passively maintain the small opening state, the active characteristics of the baffle structure has to function, so as to drive the tongue plate 2 to move to an intermediate position by the driving apparatus 8 to realize the small opening state of the helium circulator.

When the initial state of the inlet of the conical pipe is in a open state, as illustrated in FIGS. 3 and 4, the key 14 is rotated clockwise to a required angle by the driving apparatus 8, and the tongue plate 2 will rotate counterclockwise under the action of the helium pressure and the gravity of the tongue plate 2 and the crank connecting rod 3, until the clockwise side of the key 14 is adjacent to the clockwise side of the annular keyway 15, thereby maintaining the helium circulator in the position of the required opening.

When the initial state of the helium circulator is in a closed state, as illustrated in FIGS. 5 and 6, the key 14 is rotated clockwise to a required angle by the driving apparatus 8. Since the clockwise side of the key 14 is adjacent to the clockwise side of the annular keyway 15, which drives the tongue plate 2 to rotate clockwise to a required angle, the helium circulator is thereby maintained in the position of the required opening.

In summary, in order to achieve a small opening state of the helium circulator, the key 14 has to be turned clockwise to a desired angle by the driving apparatus 8, such that the clockwise side of the key 14 is adjacent to the clockwise side of the annular keyway 15.

Under accident conditions, for example, foreign matters may enter between the shaft sleeve 13 and the rotating shaft 4, if they are stuck and have to be synchronized with each other, the passive characteristics may fail. At this time, active characteristics have to function, that is, the rotating shaft 4; the shaft sleeve 13 and the key 14 are driven to be rotated together by the driving apparatus 8, thereby opening or closing the inlet of the conical pipe.

It is to be noted that when the baffle structure is used in non-return valves, check valves or other pipes to control the opening and closing of pipe, when the flow of fluid required to pass through the pipe is large, the tongue plate can be automatically rotated by the fluid pressure and tongue plate gravity, thereby realizing the opening and closing of the pipe; when the flow of fluid required to pass through the valve is small or the fluid flows in the same direction as the closing direction of the non-return valve but the non-return valve has be to maintained in the open state, the rotating of the tongue plate can be controlled by the driving apparatus, thereby realizing the opening and closing of the pipe. The tongue plate can realize control effects of opening and closing of the pipe under both active and passive functions, and can adapt to the requirements of multiple operating conditions of the pipe.

The channel baffle structure provided by the present disclosure is simple in structure, operates safely and conveniently, possesses passive and active characteristics at the same time, and can satisfy the requirements of multiple operating conditions of HTR and other pipes.

The above-mentioned description is only a preferred embodiment of the present disclosure and is not intended to limit the present disclosure. Any modifications, equivalent replacements, improvements, etc., within the spirit and principle of the present disclosure should be included in the protection scope of the present disclosure.

Industrial Utility

The present disclosure provides a channel baffle structure, which comprises a pipe, a swing check plate and a driving apparatus, wherein the swing check plate comprises a tongue plate, a crank connecting rod and a rotating shaft, one end of the crank connecting rod is connected with the tongue plate through a nut, and the other end is welded on a shaft sleeve of the rotating shaft, the pipe wall of the pipe is provided with a circular opening for placing the tongue plate in a fully open state and the crank connecting rod, a circular branch pipe is welded at the circular opening, the axis of the circular branch pipe is perpendicular to the axis of the pipe, an end of the circular branch pipe is in a form of flange structure and connected with a conical pipe side cover plate by bolts, the tongue plate, the crank connecting rod and a part of the rotating shaft of the swing check plate are arranged within the pipe, the driving apparatus is arranged outside the pipe, the swing check plate and the driving apparatus are connected through the rotating shaft, a bevel gear and a driving apparatus connecting shaft, one end of the rotating shaft is connected with the swing check plate, and the other end is connected with the bevel gear, one end of the driving apparatus connecting shaft is connected with the bevel gear, and the other end is connected with the driving apparatus, and the channel baffle structure also comprises a special structure used for connecting the driving apparatus and the swing check plate, specifically, a key is installed on the rotating shaft connected with the crank connecting rod, an annular keyway is correspondingly set within the shaft sleeve of the rotating shaft, such that the shaft sleeve has an idle travel of 90-degree free rotation around the rotating shaft, the key is positioned within the annular keyway. When the flow of fluid passes through the pipe is large, the tongue plate can be automatically rotated by fluid pressure and tongue plate gravity, thereby realizing the opening and closing of the pipe; when the flow of fluid passes through the pipe is small or the fluid flows in the same direction as the closing direction of the non-return valve but the non-return valve has be to maintained in the open state, the rotating of the tongue plate can be controlled by the driving apparatus, thereby realizing the opening and closing of the pipe. The tongue plate can realize control effects of the opening of the inlet and outlet of the channel connected with the pipe under both active and passive functions, and can adapt to the requirements of multiple operating conditions of the channel. The present disclosure has strong utility.

What is claimed is:
1. A channel baffle structure, comprising:
a pipe;
a swing check plate; and
a driving apparatus;
wherein the swing check plate comprises a tongue plate, a crank connecting rod and a rotating shaft, one end of the crank connecting rod being connected with the tongue plate through a nut, and the other end of the crank connecting rod being welded to a shaft sleeve of the rotating shaft;
wherein a pipe wall of the pipe includes a circular opening for placing the tongue plate in a fully open state, a circular branch pipe being welded at the circular opening, an axis of the circular branch pipe being perpendicular to an axis of the pipe, an end of the circular branch pipe being in a form of a flange structure and connected with a pipe side cover plate by bolts;

wherein the tongue plate, the crank connecting rod and a part of the rotating shaft of the swing check plate are arranged within the pipe, the driving apparatus disposed outside the pipe;

wherein the swing check plate and the driving apparatus are connected through the rotating shaft, a bevel gear and a driving apparatus connecting shaft, one end of the rotating shaft being connected with the swing check plate, and the other end of the rotating shaft being connected with the bevel gear; one end of the driving apparatus connecting shaft being connected with the bevel gear, and the other end of the driving apparatus connecting shaft being connected with the driving apparatus; and wherein a structure for connecting the driving apparatus and the swing check plate comprises a key installed on the rotating shaft and connected with the crank connecting rod, an annular keyway correspondingly set within the shaft sleeve of the rotating shaft, such that the shaft sleeve has an idle travel of 90-degree free rotation around the rotating shaft, and the key is positioned within the annular keyway.

2. The channel baffle structure of claim 1, wherein the rotating shaft is disposed at an inlet end of the pipe.

3. The channel baffle structure of claim 1, wherein a supporting frame is welded at an outer wall surface of the pipe and a lower part of the rotating shaft so as to support the rotating shaft.

4. The channel baffle structure of claim 1, wherein, taking the axis of the rotating shaft as a reference direction, a radial height of the annular keyway is 0.1-0.3 mm higher than a radial height of the key, a circumferential angle α of the annular keyway is between 90° and 100°, and an axial length of the annular keyway is 0.1-0.3 mm longer than an axial length of the key.

5. The channel baffle structure of claim 1, wherein the annular keyway is in clearance fit with the key.

6. The channel baffle structure of claim 1, wherein a fully open position annular sealing surface adjacent to the pipe wall of the pipe is welded at an inner wall surface of the circular branch pipe of the pipe, and when the pipe is in the fully open state, the tongue plate is in contact with the fully open position annular sealing surface.

7. The channel baffle structure of claim 1, wherein a fully closed position annular sealing surface is disposed at an inlet end of the pipe adjacent to the pipe wall, and when the pipe is in a fully closed state, the tongue plate is in contact with the fully closed position annular sealing surface.

8. The channel baffle structure of claim 1, wherein, when the driving apparatus controls the pipe to be opened or closed, the key is directly above the rotating shaft when viewed from a direction parallel to the axis of the rotating shaft.

9. The channel baffle structure of claim 1, wherein, in an operating condition of small flow, after the pipe is actively opened or closed through the driving apparatus to drive the tongue plate to move, it is required to rotate the rotating shaft reversely by the driving apparatus, such that the key rotates in the annular keyway reversely, until it is located directly above the rotating shaft, so as to prepare to open or close the tongue plate next time.

10. The channel baffle structure of claim 1, wherein, in order to achieve a small opening state of the pipe when fluid flows in a reverse direction, when viewed from a direction parallel to the axis of the rotating shaft, the key must be turned clockwise to a desired angle by the driving apparatus, such that the clockwise side of the key is adjacent to the clockwise side of the annular keyway.

* * * * *